W. MYCOCK.
BEARING FOR THE CYLINDERS OF DRYING MACHINES.
APPLICATION FILED APR. 15, 1919.

1,342,131.

Patented June 1, 1920.
3 SHEETS—SHEET 1.

INVENTOR

UNITED STATES PATENT OFFICE.

WILLIAM MYCOCK, OF MANCHESTER, ENGLAND.

BEARING FOR THE CYLINDERS OF DRYING-MACHINES.

1,342,131.     Specification of Letters Patent.     Patented June 1, 1920.

Application filed April 15, 1919. Serial No. 290,286.

*To all whom it may concern:*

Be it known that I, WILLIAM MYCOCK, a British subject, residing at Brestwich, Manchester, county of Lancaster, England, have invented certain new and useful Improvements in Bearings for the Cylinders of Drying-Machines, of which the following is a specification.

This invention relates to machines for drying fabrics and more particularly to the bearings or "doll-heads" of the cylinders of such machines in which an interior non-rotary sleeve of spherical contour is fitted to receive and form a bearing for the trunnion of the cylinder held in position therein by a cage.

This invention is designed to provide an improved doll-head which will give a better bearing to the nozzle or trunnion of the cylinder without the friction of packing, while at the same time preventing access of steam thereto, and a cage of spiral form to retain the sleeve in position.

It will be fully described with reference to the accompanying drawings.

The bearing or doll-head A is externally and internally of ordinary construction or appearance with double flanges A' A².

In the interior of the doll-head or bearing A is fitted a non-rotary sleeve or bush B of considerable length to receive and form a bearing for the trunnion C of the cylinder C'.

The bush or sleeve B is made spherical externally at or near its longitudinal center to give a universal movement, this spherical part being a close fit within the casing $a$ of the doll-head A. It is formed internally to fit closely to the trunnion C of the cylinder and with a shoulder $b$ at one end which when pressed into position abuts against the end of, or a shoulder $c$ on, the trunnion C to make a metal to metal steam tight joint. Behind the sleeve or bush B, a cage or open sleeve D is placed which is preferably of spiral form and made of cast iron or other suitable material and embraces the end of the sleeve B. Between the end of the spiral cage D and the spherical part of the sleeve or bush B, a joint ring $d$ of rubber or other suitable packing material is placed to form a steam tight joint between the spherical bush and the casing $a$, but so as to apply no pressure or friction to the trunnion C.

The shoulder $b$ of the bush B is held tightly pressed against the end of the trunnion C or against the shoulder $c$ thereon by the cage D, thereby forming a steam tight joint. The end of the casing $a$ of the doll-head is solid or closed by a plate bolted thereto with a screw $a'$ to tighten up the cage and joint ring.

The trunnion of the cylinder fits into the inner bush or sleeve B and abuts against the shoulder $b$ therein to form a metal to metal steam tight joint. A ring of metal or other material may be placed between the end or shoulder of the trunnion and the shoulder $b$ if found necessary to insure a steam tight joint and prevent steam entering the bearing.

By this construction the necessity of packing applied to the trunnion of the cylinder and the consequent friction thereon is obviated.

Figure 1:
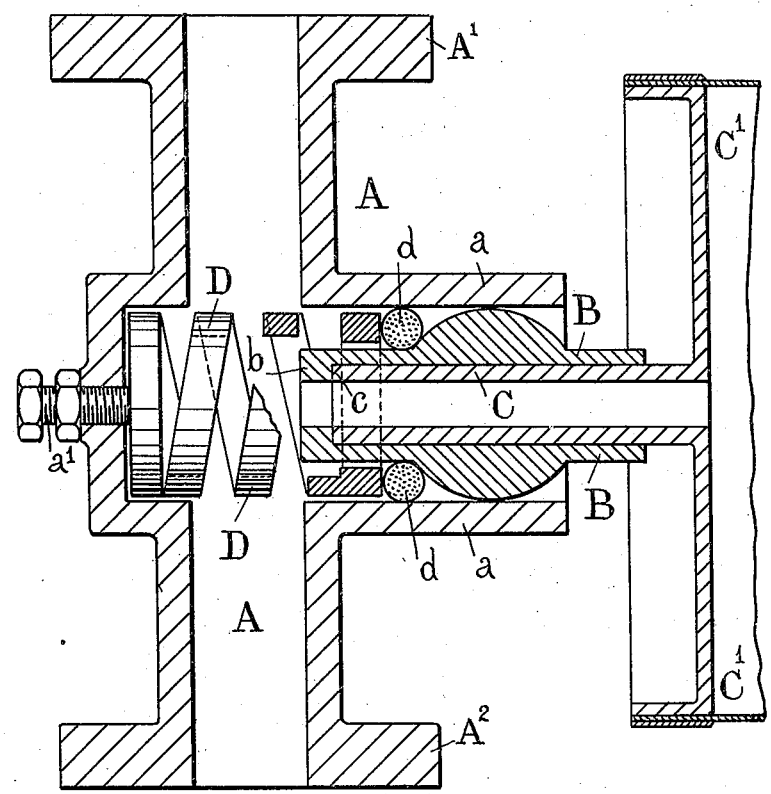
Figure 1 is a sectional elevation through a doll-head A and the end of a drying cylinder and trunnion C.
Figure 2:
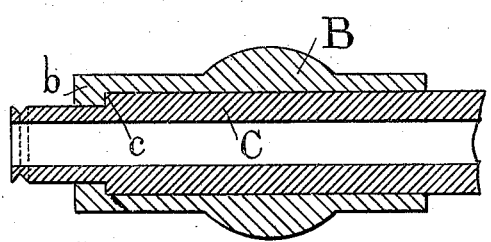
Fig. 2 is a sectional elevation showing a modified construction of the bush B and trunnion C.
Figure 3:
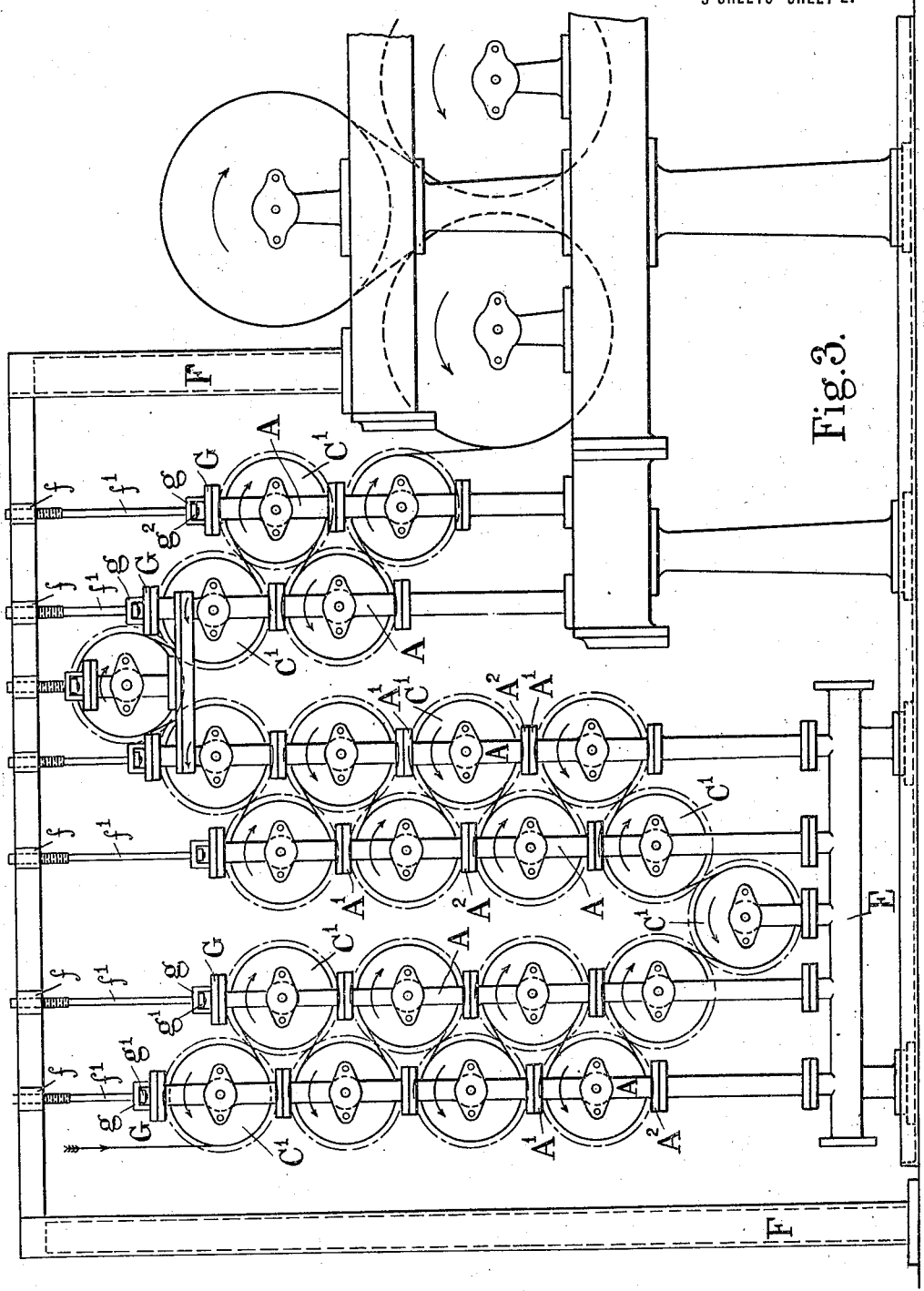
Fig. 3 is a side elevation of the drying machine.
Figure 4:
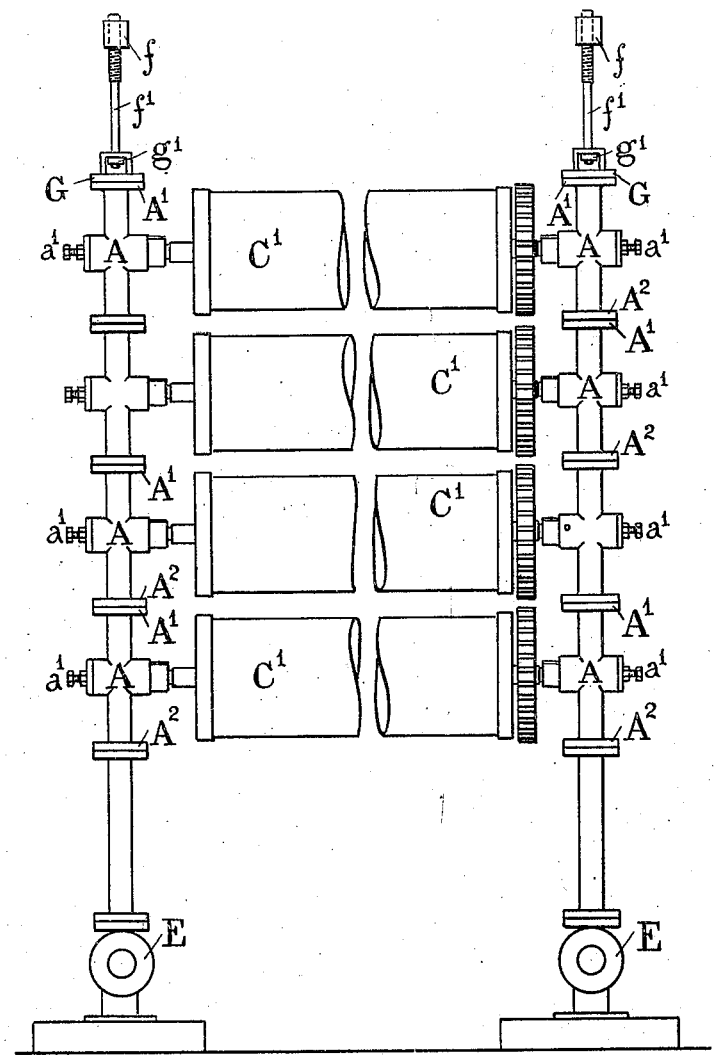
Fig. 4 is an end elevation of same.

The drying machine is built up of a number of the cylinders C'. Each doll-head A is made of uniform size and each succeeding head is bolted to the one below it as shown in Figs. 3 and 4, the lowest head being bolted to the steam supply pipe E, thus forming a vertical column.

A framing F of angle or other section is placed at both sides of the machine the upper transverse member being formed with a number of holes with nuts $f$ through which screwed rods or bolts $f'$ are passed and to the top of each uppermost doll-head is fitted a blank flange G with a bridle or cross bar $g$ into which is fitted a washer $g'$ made fast to the end of the screwed rod $f'$. The screwed rod steadies and holds each column firm and rigid, and supports the column when desired to remove a cylinder.

On the journal or trunnion of each cylinder C' a spur wheel is mounted in the usual way and the doll-heads carrying the rollers or cylinders are so arranged relatively to one another that one driving wheel can drive four columns of rollers, the drive being transmitted from one cylinder to another through the spur wheels in the usual way.

What I claim as my invention and desire to protect by Letters Patent is:—

1. In a doll-head or bearing for the cylinders of drying machines a bearing sleeve or bush of spherical external contour formed with a shoulder on the interior against which an abutment surface on the trunnion abuts to form a steam tight joint substantially as described.

2. A doll-head or bearing for the cylinders of drying machines comprising in its construction a casing to receive a bearing, a bearing bush to receive the trunnion of a drying cylinder, said bearing being of spherical external contour with a cylindrical extension at both ends and internally formed with an abutment shoulder, a packing ring around the exterior and a cage and screw to hold the bush and packing in position and form a steam tight joint at the abutment shoulder substantially as described.

In testimony whereof I have hereunto set my hand in presence of two subscribing witnesses.

WILLIAM MYCOCK.

Witnesses:
J. OWDEN O'BRIEN,
GEO. H. O'BRIEN,